N. H. HILLER.
PROCESS OF REFRIGERATION AND APPARATUS THEREFOR.
APPLICATION FILED JUNE 15, 1912.
1,109,923.
Patented Sept. 8, 1914.
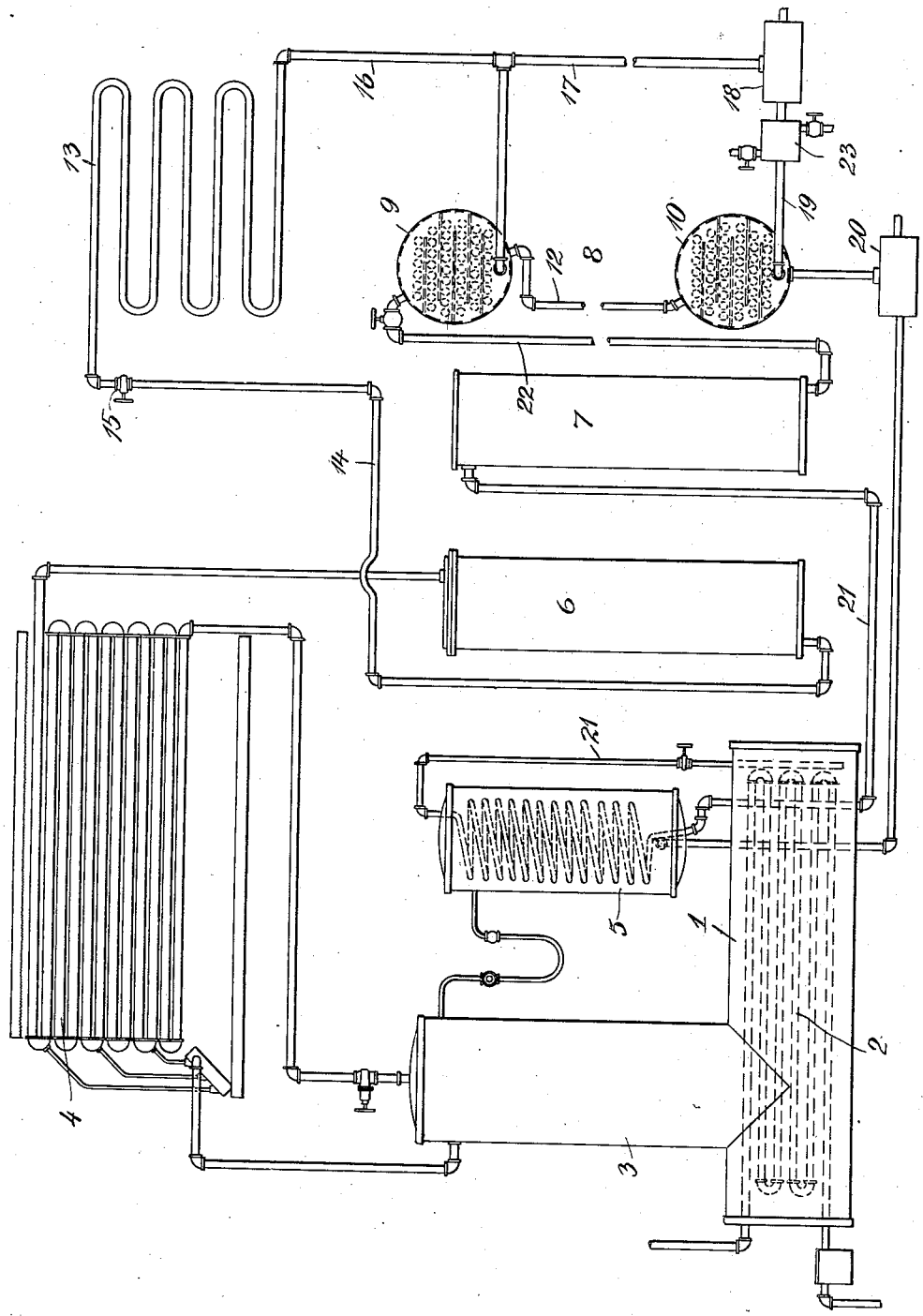

UNITED STATES PATENT OFFICE.

NICOLAI H. HILLER, OF CARBONDALE, PENNSYLVANIA.

PROCESS OF REFRIGERATION AND APPARATUS THEREFOR.

1,109,923.  Specification of Letters Patent.  Patented Sept. 8, 1914.

Application filed June 15, 1912.  Serial No. 703,882.

*To all whom it may concern:*

Be it known that I, NICOLAI H. HILLER, a citizen of the United States of America, and a resident of Carbondale, county of Lackawanna, and State of Pennsylvania, have invented certain new and useful Processes of Refrigeration and Apparatus Therefor, of which the following is a specification:

My invention relates to improvements in processes of and apparatus for effecting heat absorption or refrigeration by the alternate expansion from liquid to gas, and condensation from gas to liquid, of a suitable refrigerating agent, such for example as ammonia gas.

My invention comprises a combined absorption and compression system, including a multi-stage absorber, the stages of which are maintained at different pressures, the gas, as received from the return line of the system, being in part passed into a low pressure stage of such absorber and absorbed in liquid therein, which liquid then passes into a higher-pressure stage of the absorber, the remainder of the gas being compressed to a relatively low pressure mechanically, and then passed into the said high-pressure stage of the absorber. By so doing I effect notable economies over either the plain absorption system, or the plain compression system, besides permitting the use in the absorber of cooling water of relatively high temperature. This use of cooling water of relatively high temperature is extremely desirable, since in many locations it is difficult at times to obtain cooling water of the low temperatures required for satisfactory operation of an ordinary absorption apparatus.

My invention further comprises a novel combination of compression and absorption refrigeration apparatus, wherein a portion of the returned gas is absorbed in a low pressure stage of an absorber at substantially the back pressure in the return line, and wherein a compressor compresses the remainder of the return gas to a suitable pressure, and then delivers it to a higher pressure stage of the absorber. And my invention consists further in other features hereinafter described and particularly pointed out in the appended claims.

The objects of my invention are to increase the economy of refrigeration apparatus, to permit the use of cooling water of relatively high temperature, and to provide apparatus which, while accomplishing the above objects, is simple, compact and easily operated.

I will now proceed to describe my invention with reference to the accompanying drawing and will then point out the novel features in claims. The said drawing shows diagrammatically and in elevation a refrigerating apparatus embodying my invention and adapted to carry out the process herein described.

I have found that the capacity, economy and efficiency of absorption refrigeration apparatus, particularly when the generators or stills of such apparatus are operated by low pressure steam, (exhaust steam, for example) are greatly affected by the pressure at which the return gas is delivered to the absorber; also that the capacity and economy are greatly affected by the temperature of the cooling water employed in the absorber. I have found for example, that, with absorption apparatus of good well known type, and with cooling water at 60° Fahrenheit, the steam consumption, at three pounds gage pressure, is about as follows:

*Steam consumption, cooling water at 60° Fahrenheit.*

| Back pressure in return line. | Steam consumption. |
|---|---|
| 5 lbs. gage. | 35 lbs. per ton of refrigeration. |
| 10 lbs. gage. | 30.5 lbs. per ton of refrigeration. |
| 15 lbs. gage. | 27 lbs. per ton of refrigeration. |
| 30 lbs. gage. | 20 lbs. per ton of refrigeration. |

Similarly, when the cooling water is of 80° Fahrenheit, it has been found, that the steam consumption is about as follows:

*Steam consumption, cooling water at 80° Fahrenheit.*

| Back pressure in return line. | Steam consumption. |
|---|---|
| 3 lbs. gage. | 43 lbs. per ton of refrigeration. |
| 19 lbs. gage. | 34 lbs. per ton of refrigeration. |
| 35 lbs. gage. | 29 lbs. per ton of refrigeration. |

It is of course desirable to operate the still or generator of the absorption apparatus, with low pressure steam, preferably the exhaust steam of a steam engine, having a pressure, usually of about three pounds; but it has been found practically impossible to operate an ordinary absorption plant with low pressure steam, and cooling water at 80° Fahrenheit, and low pressure of the return gas. With 80° Fahrenheit cooling water it has been found necessary to use steam of fifty pounds gage pressure in the generator when the pressure of the return gas is as low as three pounds, and to use steam of fifteen pounds gage pressure when the pressure of the return gas is nineteen pounds. With the return gas at thirty five pounds pressure it has been found practicable to operate the generator with steam at three pounds pressure. It is not practicable, however, to regulate the back pressure in the refrigeration coils according to the best pressure at which to conduct absorption with cooling water of relatively high temperature; the back pressure in the cooling coils must be such as to produce in those coils the particular temperature required; therefore, heretofore, it has not been practicable to conduct refrigeration with steam of low pressure, and cooling water of so high a temperature as 80°, since it was not practicable to operate the refrigeration coils with a high back pressure, such for example as thirty five pounds. Now, according to my invention, I operate the cooling coils at whatever back pressure is desirable, and before the return gas is delivered to the absorber I raise the pressure of such return gas, by compression, to a pressure at which absorption may be conducted economically with cooling water of the temperature available, and to a pressure such that the resulting strong ammonia liquor may be evaporated economically, in the generator, with low pressure steam.

It will be understood that the higher the pressure at which the return gas is supplied to the absorber, the richer, in general, will be the strong ammonia liquor produced in that absorber, and therefore the easier will be the evaporation of the ammonia from that strong liquor in that absorber, and the lower will be the quantity and pressure of the steam required for such evaporation.

In the accompanying drawings 1 designates the generator or still of a well known type of absorption refrigeration apparatus, 2 designates the heating coils thereof, 3 the column or analyzer of such apparatus, 4 the rectifier of such apparatus, 5 the heat exchanger of such apparatus, and 6 the usual condenser of such apparatus, and 7 the usual weak liquor cooler. I have not illustrated in detail the construction of these parts of the absorption refrigeration apparatus, as they are of well known construction, nor have I attempted to illustrate all of the piping, valves, gages, etc., with which such absorption apparatus is commonly supplied.

8 designates the absorber which in this case is of peculiar construction, in that it comprises two separate absorption vessels, 9 and 10, located at different levels and connected by a pipe 12. Each of these absorption vessels is of well known type, for example, of the type shown in my Patent No. 998,292, dated July 18, 1911, comprising horizontal drums or cylinders within which are suitable baffles and suitable cooling-water pipes.

13 designates a refrigeration coil, to which anhydrous ammonia or other suitable liquefied refrigerant is supplied by means of a pipe 14, and expansion valve 15, and 16 designates a return line conveying the expanded gas to the absorber. As shown, this pipe 16 is connected to the upper drum 9 of the absorber, but there is also a branch connection 17 to a compression pump 18 the discharge pipe 19 of this pump leading to the lower drum 10 of the absorber.

20 designates the usual strong liquor pump for pumping the strong liquor from the absorber through the exchanger 5 to the analyzer 3, from whence the strong liquor enters the still 1, and 21 designates the usual pipe for leading the weak liquor from the bottom of the still through the exchanger to the cooler 7; whence the weak liquor passes through pipe 22 to the upper section 9 of the absorber.

In the operation of this apparatus the refrigeration coil or coils 13 is or are operated at such back pressure as is suitable for the temperature plane to be maintained by such refrigeration coils; and the expanded gas is delivered by pipe 16 in part to the upper drum 9 of the absorber, and in part to the compression pump 18. Owing to the difference in elevation of the drums 9 and 10 of the absorber, there will be a much higher pressure in drum 10 than in drum 9. This difference in elevation of the two drums 9 and 10 will be in approximate proportion to the difference between the back pressure in return line 16 and the higher pressure at which the main portion of the absorption is to be conducted, so that the pressure in drum 9 will be that of the return line 16 and the pressure in drum 10, owing to the hydrostatic head, will be that at which the main absorption is to be conducted. So much of the return gas passes to the absorber drum 9 and is absorbed therein as will absorb readily in that section, at the pressure and temperature therein maintained; and the strong liquor from this absorber section 9 passes through the pipe 12 to the lower section 10. The remainder of the gas is delivered by pipe 17 to the suction side of the compressor 18, is compressed in that compressor to the desired terminal pressure, and is thence delivered into absorber 10, wherein the gas is absorbed at the higher pressure maintained in that absorption section 10. The strong liquor is then delivered from section 10, by pump 20 to the heat exchanger, and so to the analyzer and still.

Practice shows that the power actually required to operate the various customary auxiliaries and the gas pump 18, is above as follows per ton of refrigeration:

```
Ammonia pump............................. .10 H. P.
Water pump................................ .20 H. P.
Brine agitator and boiler feed pump........ .05 H. P.
Gas pump.................................. .25 H. P.
                                           ---------
                                           .60 H. P.
```

Assuming that these various auxiliaries are driven by an economical steam engine, producing power, when operating at three pounds gage back pressure, with a steam consumption of thirty pounds per horse power, and assuming that the power transmission losses amount to .15 H. P. per ton of refrigeration, then the steam required to operate these various auxiliaries will be about 22.5 pounds per ton of refrigeration. From what has been said above, it will be seen that with cooling water for the absorber available at 60° Fahrenheit, and the return gas delivered to the absorber at thirty pounds back pressure, the steam required in the generator per ton of refrigeration is about twenty pounds. In other words, the exhaust of the engine driving the various auxiliaries is amply sufficient to operate the generator; while with cooling water at 80° Fahrenheit and absorption conducted at forty five pounds, but little, if any, excess steam over that supplied by the exhaust of the engine will be required for the operation of the generator, for the gas pump 18, receiving gas at fifteen pounds and compressing to forty five pounds, has been found to require about .44 H. P. per ton of refrigeration; but the absorption conducted in the lower section 10 will be only from one half to two thirds of the total absorption—we will suppose it to be two thirds; therefore the power consumption of the gas pump 18 may be considered to be two thirds of .44 H. P. per ton of refrigeration, or .30 H. P. per ton of refrigeration; the total horse power required for the operation of the auxiliaries including power transmission losses, being then .80 H. P., so that the engine driving these auxiliaries will supply about 24 pounds of steam per ton of refrigeration, and the steam consumption of the absorption plant, with cooling water at 80° Fahrenheit and absorption at forty five pounds, will be in the neighborhood of twenty nine pounds of steam per ton of refrigeration. The excess steam for operation at this absorption pressure, with cooling water at 80° Fahrenheit, may be supplied readily by evaporating apparatus for supplying pure distilled water for ice making, such for example as an evaporating apparatus shown in my Patent No. 970,051, dated September 13, 1910. It follows therefore, that an absorption apparatus as herein described will operate with only about two thirds of the steam consumption of the ordinary absorption apparatus, and will operate with that economy, with steam for the generator at as low a pressure as three pounds, and with a back pressure on the refrigeration coils as low as is desirable, the back pressure in the refrigeration coils being entirely independent of the pressure at which absorption is conducted in the lower or main section of the absorber. If found desirable, a cooler 23 may be inserted between the compression pump 18 and the absorber.

What I claim is:—

1. The herein described method of effecting refrigeration, which comprises expanding a refrigerating fluid under pressure to a suitable lower pressure, and thereby absorbing heat, absorbing a portion of the resulting gas in liquid at about the pressure resulting from such expansion, compressing a further portion of the resulting gas to a higher pressure than that to which such gas is expanded, absorbing the gas so compressed in liquid, and at about the pressure to which the gas is so compressed, and evaporating the gas from such liquid under pressure, and again expanding it.

2. The herein described method of effecting refrigeration, which comprises expanding a refrigerating fluid under pressure to a suitable lower pressure, and thereby absorbing heat, absorbing a portion of the resulting gas in liquid at about the pressure resulting from such expansion, compressing a further portion of the resulting gas to a higher pressure than that to which such gas is expanded, absorbing the gas so compressed in the liquid resulting from the first absorption, and at about the pressure to which the gas is so compressed, and evaporating the gas from such liquid under pressure, and again expanding it.

3. Absorption refrigeration apparatus comprising in combination a generator and a multi-stage absorber, the stages of which are maintained at different pressures, an expansion chamber to which the refrigerating agent delivered by the generator is supplied, the low pressure stage of the absorber connected to receive a portion of the gas from such expansion chamber, and a compressor connected to receive a further portion of the gas, from such expansion chamber, and to deliver such gas, compressed, to the higher pressure stage of such absorber.

4. Absorption refrigeration apparatus comprising in combination a generator and a multi-stage absorber comprising a plurality of absorbing vessels at different levels proportionate to the different pressures to be maintained in said vessels, an expansion chamber to which the refrigerating agent delivered by the generator is supplied, the low pressure stage of the absorber connected to receive a portion of the gas from such expansion chamber, and a compressor connected to receive a further portion of the gas from such expansion chamber and to deliver such gas, compressed, to the higher pressure stage of such absorber.

5. Absorption refrigeration apparatus comprising in combination a generator and a multi-stage absorber comprising a plurality of absorbing vessels at different levels proportionate to the different pressures to be maintained in said vessels, an expansion chamber to which the refrigerating agent delivered by the generator is supplied, the low pressure stage of the absorber connected to receive a portion of the gas from such expansion chamber, and a compressor connected to receive a further portion of the gas from such expansion chamber and to deliver such gas, compressed, to the higher pressure stage of such absorber, said absorber comprising means for the flow of absorbing liquid from the low pressure absorption vessel to the high pressure absorption vessel.

In testimony whereof I have signed this specification in the presence of two subscribing witnesses.

NICOLAI H. HILLER.

Witnesses:
H. M. MARBLE,
D. A. DAVIES.